United States Patent
Gombert et al.

(10) Patent No.: US 7,983,792 B2
(45) Date of Patent: Jul. 19, 2011

(54) METHOD AND SYSTEM FOR THE PRODUCTION OF VARIABLE-DIMENSIONAL PRINTED SUBSTRATES

(75) Inventors: Barry Glynn Gombert, Rochester, NY (US); Philip Crane Rose, Sodus, NY (US); Sri Hemanth Prakhya, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 360 days.

(21) Appl. No.: 12/256,030

(22) Filed: Oct. 22, 2008

(65) Prior Publication Data

US 2010/0098319 A1    Apr. 22, 2010

(51) Int. Cl.
G06F 17/00 (2006.01)
G06F 19/00 (2006.01)
B65B 43/08 (2006.01)
B65B 9/00 (2006.01)
B65B 43/26 (2006.01)

(52) U.S. Cl. .......... 700/233; 700/98; 700/118; 700/163; 700/231; 700/235; 53/456; 53/460

(58) Field of Classification Search .......... 700/95, 700/97–98, 118, 127–128, 163, 227, 231–236; 264/512, 516; 53/410, 456, 460
See application file for complete search history.

(56) References Cited

U.S. PATENT DOCUMENTS

| | | | | |
|---|---|---|---|---|
| 3,902,655 A * | 9/1975 | Huffman | ........................ | 229/69 |
| 5,235,519 A * | 8/1993 | Miura | ........................ | 700/233 |
| 5,457,904 A * | 10/1995 | Colvin | ........................ | 40/119 |
| 5,513,117 A * | 4/1996 | Small | ........................ | 700/233 |
| 5,518,574 A * | 5/1996 | Yates et al. | ........................ | 156/356 |
| 5,687,087 A * | 11/1997 | Taggart | ........................ | 700/233 |
| 5,768,142 A * | 6/1998 | Jacobs | ........................ | 700/231 |
| 5,805,784 A | 9/1998 | Crawford | | |
| 5,881,538 A * | 3/1999 | Blohm | ........................ | 53/461 |
| 5,923,556 A * | 7/1999 | Harris | ........................ | 700/117 |
| 6,092,054 A * | 7/2000 | Tackbary et al. | ........................ | 705/27 |
| 6,134,018 A | 10/2000 | Dziesietnik et al. | | |
| 6,153,039 A * | 11/2000 | Jacobsen | ........................ | 156/277 |
| 6,243,172 B1 | 6/2001 | Gauthier et al. | | |
| 6,332,149 B1 | 12/2001 | Warmus et al. | | |
| 6,687,016 B2 | 2/2004 | Gauthier | | |
| 6,771,387 B2 | 8/2004 | Gauthier | | |
| 6,896,250 B2 * | 5/2005 | Hillebrand | ........................ | 270/52.09 |
| 6,948,115 B2 | 9/2005 | Aizikowitz et al. | | |
| 6,953,513 B1 * | 10/2005 | Volkert | ........................ | 156/256 |
| 7,172,113 B2 * | 2/2007 | Olenick et al. | ........................ | 235/380 |
| 7,236,258 B2 * | 6/2007 | Wen et al. | ........................ | 358/1.12 |
| 7,406,194 B2 | 7/2008 | Aizikowitz et al. | | |
| 7,765,469 B2 * | 7/2010 | Sembower et al. | ........................ | 715/243 |
| 7,788,883 B2 * | 9/2010 | Buckley et al. | ........................ | 53/456 |
| 7,832,560 B2 * | 11/2010 | Tilton | ........................ | 206/462 |
| 2005/0278614 A1 | 12/2005 | Aizikowitz et al. | | |
| 2005/0278621 A1 | 12/2005 | Aizikowitz et al. | | |
| 2006/0217831 A1 * | 9/2006 | Butterworth et al. | ........................ | 700/126 |
| 2006/0284360 A1 * | 12/2006 | Hume et al. | ........................ | 270/1.02 |
| 2007/0041035 A1 | 2/2007 | Sembower et al. | | |
| 2009/0070213 A1 * | 3/2009 | Miller et al. | ........................ | 705/14 |
| 2010/0060909 A1 * | 3/2010 | Conescu et al. | ........................ | 358/1.9 |

* cited by examiner

Primary Examiner — Ramesh B Patel
(74) Attorney, Agent, or Firm — Pepper Hamilton LLP

(57) ABSTRACT

A method and system for generating a customized, printed, three-dimensional object accesses a data record for a selected recipient and prints objects on a substrate based on the data record. The method and system then generates die lines based on the data record, and finishes the substrate by cutting, perforating, creasing, folding or otherwise finishing the substrate along the die lines to yield a customized, three-dimensional printed object.

19 Claims, 3 Drawing Sheets

METHOD AND SYSTEM FOR THE PRODUCTION OF VARIABLE-DIMENSIONAL PRINTED SUBSTRATES

BACKGROUND

The disclosed embodiments relate generally to methods and systems for creating printed objects having three-dimensional structure.

Printing systems are no longer limited to devices that print text and images on two-dimensional substrates. Greeting cards, pop-up books, and packages are examples of printed substrates that can move from a flat structure to a three dimensional structure through manipulation of folds, creases, cuts and perforations. It is desirable that printing systems include or collaborate with variable structural data generating and finishing systems so that together they can print text and images on a substrate and also perform structural functions such as cutting, perforating, or scoring for folds so that the resulting substrate can be manipulated into a three-dimensional structure.

Personalized dimensional items are highly desirable, but expensive to produce, as the production must be done manually or with a support system that can be expensive or inefficient. Current structural printing systems implement a set of instructions and can mass-produce similar items, but the systems have limited ability to customize print jobs with structural features. These limitations can cause delays in assembly time as the system is reprogrammed or manually manipulated to change images and/or substrates, Prior systems exist for the production of customized two-dimensional documents. For example, U.S. Pat. No. 6,948,115 to Aizikowitz et al., the disclosure of which is hereby incorporated by reference in its entirety, discloses a method of producing a personalized document using a variable information page description language output stream. However, such systems have limited ability to efficiently produce three-dimensional and/or structural information for the documents.

This document describes systems that solve one or more of the problems listed above.

SUMMARY

One embodiment described in this document is a system for producing a printed substrate having structural features. The production system includes a memory storing multiple recipient records. Each recipient record includes one or more customized or customizable objects to be printed on a substrate, thus yielding a customized substrate. The recipient records also may include data corresponding to at least one structural feature. This embodiment of the system includes a data iterator that selects a recipient record from the memory, and a document instance generator that generates an output sequence for rendering the customized substrate as a printed document. The output sequence includes instructions in object-oriented code for printing one or more objects from the selected recipient record on the customized substrate. Optionally, the object-oriented code may be compatible with the variable print specification (VPS) language, virtual reality modeling language (VRML) personalized print markup language (PPML), or portable document format (PDF).

This embodiment of the system also includes a rendering system that prints the object or objects on the customized substrate. This embodiment of the system also includes a structural design producer that generates a die line output code sequence in an object-oriented code based on the selected recipient record. This embodiment of the system also includes a converting system that applies structural features to the customized substrate based on the generated die line code sequence. Optionally, the structural features may include a crease, fold, cut, slit, application of an adhesive, insert, or perforation to the substrate along the die lines.

Optionally, the data iterator and the document instance generator may be a single device, such as a processor, or they may be different devices. If they are different devices, the system may also include a content buffer that enables the data iterator to operate as a producer and the document instance generator to operate as a consumer, so that the two devices operate together in a producer-consumer manner.

Optionally, the production system may include a definitions dictionary containing reusable object names and definitions for the names. If so, the document instance generator may also use information from the definitions dictionary to generate the document rendering output sequence. The system also may include a dies database comprising layout information for pages of dynamic structural document instances. If so, the structural design producer may also use information from the dies database dictionary to generate the die line output code sequence.

In an alternate embodiment, a method of printing a customized printed substrate includes receiving a structural design template for a first substrate to be printed; receiving a first recipient record; using the first recipient record to render one or more printed objects on the first printed substrate, and generating a first code sequence based on the first structural design template and the first recipient record. The first code sequence may include instructions for creating a first die line for the application of a structural feature on the first substrate, such that the first die line corresponds to data from the first recipient record. The method also may include appending the first code sequence to a first output code sequence in an object-oriented language, and using a converting system to apply at least one three-dimensional structural feature to the first substrate based on the first code sequence. The structural features may include items such as a crease, fold, cut, slit, insert, adhesive application, or perforation.

The method may be repeated for a second recipient record and a corresponding second printed substrate, as well as additional records and substrates. If so, the code sequences for each substrate may be included in a single code sequence or in separate code sequences.

Optionally, the method also may include identifying a computer-aided manufacturing definition for the converting system and ensuring that the instructions for creating the first die line are compatible with the computer-aided manufacturing definition. Generating each code sequence may include generating a customized set of instructions for the die line based on the data from the corresponding recipient record.

In some embodiments of the method, the rendering may include printing a unique identifier, such as a bar code, on the first substrate. If so, generating the code sequence may include using the unique identifier to identify and select the first die line.

DETAILED DESCRIPTION

Before the present embodiments are described, it is to be understood that this invention is not limited to the particular systems, methodologies or protocols described, as these may vary. Also, the terminology used herein is for the purpose of describing particular embodiments and is not intended to limit the scope of the present disclosure, which will be limited only by the appended claims.

As used in this description and in the appended claims, the singular forms "a," "an," and "the" include the plural reference unless the context clearly dictates otherwise. Unless defined otherwise, all technical and scientific terms used herein have the same meanings as commonly understood by one of ordinary skill in the art. As used herein, the term "comprising" means "including, but not limited to.""document production device" is an electronic device that is capable of receiving commands and printing text and/or images on a substrate. Document production devices may include, but are not limited to, network printers, production printers, copiers and other devices that apply text and images using ink or toner. Printing devices may also perform a combination of functions such as printing and scanning, in which case such devices may be considered to be multifunctional devices. Printing devices may create two-dimensional documents, or they may create a graphical flat that can be converted to yield a three-dimensional item such as a package.

Figure 1:
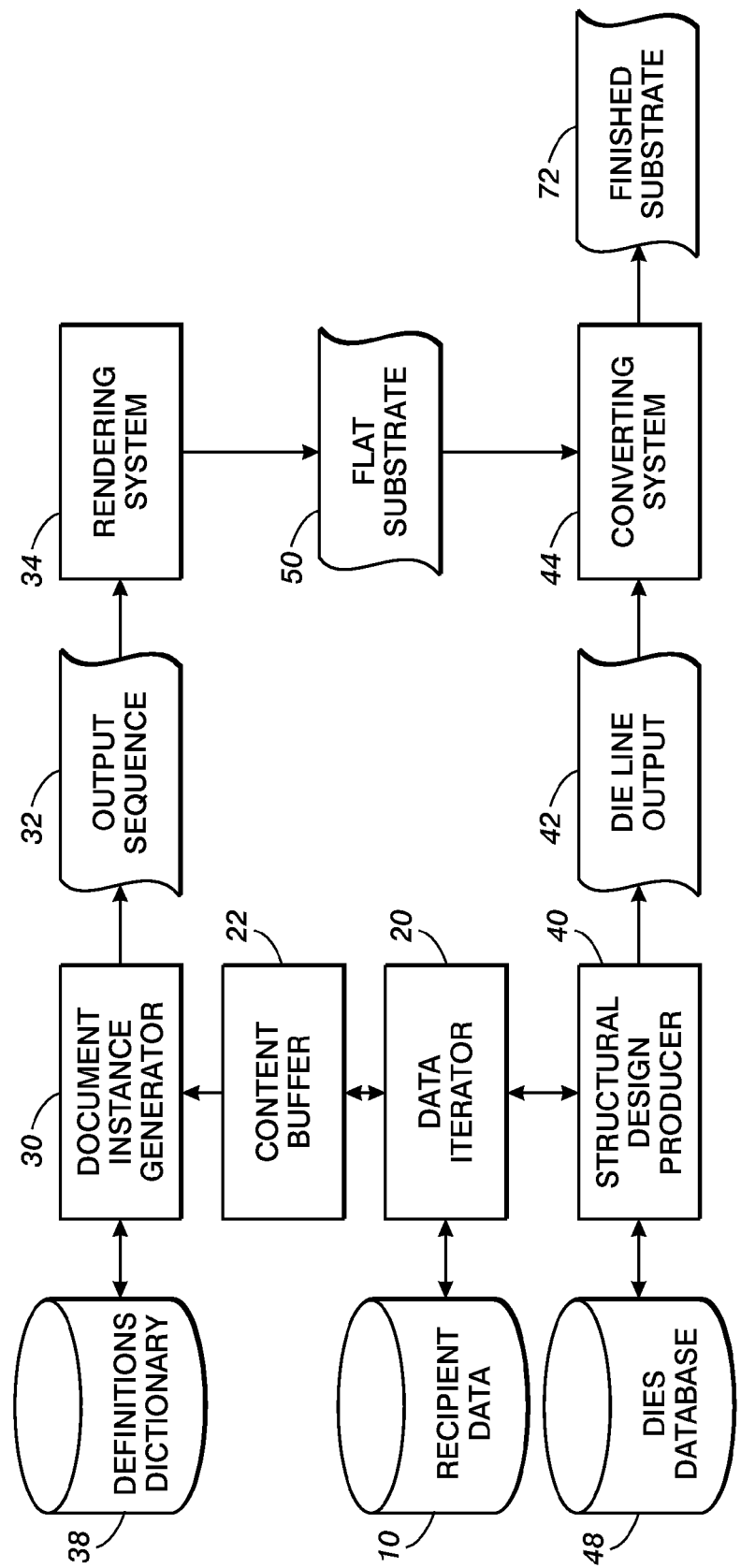
FIG. 1 illustrates an exemplary system for producing customized, printed three-dimensional substrates.

FIG. 1 illustrates a system for producing a printed substrate having structural features. Such substrates may include, for example, a three-dimensional package, a pop-up document, a greeting card, or another item. As shown in FIG. 1, the system includes a memory containing recipient data 10, and a data iterator 20, a document instance generator 30, and a structural design producer 40 that accesses and/or receives recipient records from the memory 10.

Each recipient record in the memory 10 includes data corresponding to one or more objects to be printed on a customized substrate, such as a document, package flat, card, or other substrate. The term "customized substrate," when used in this patent document, refers to a substrate that contains printed material and/or structural features that are customized based on a received record such as a recipient data record. Each object represents an image or text, such as graphics, words, numbers, designs, colors, or other indicia that may be printed onto the substrate. The recipient records also may include data corresponding to at least one structural feature and/or data that can facilitate the creation of a structural feature. The data iterator 20 is a processor and/or a program instruction set running on a processor that selects a recipient record from the memory 10 and sends the object data from the record to the document instance generator 30 and the structural design producer 40. Optionally, a content buffer 22 may hold the data before delivery to the document instance generator 30. If so, the data iterator 20 may operate as a producer, the document instance generator 30 may operate as a consumer, and the data iterator 20 and document producer 30 may operate together in a producer-consumer relationship. If so, the data iterator 20 may determine the layouts and content objects for the output sequence 32.

The document instance generator 30 is a processor and/or a program instruction set running on a processor that generates an output sequence 32 for rendering the customized substrate as a printed document. The output sequence 32 is generated in an object-oriented code, such as the variable print specification (VPS) language, personalized print markup language (PPML), or portable document format (PDF). Optionally, the document instance generator 30 may access a definitions dictionary 38 which contains reusable object names and definitions for the names, and the document instance generator 30 may use this information to generate the output sequence 32. The definitions database may include the code formal or an image format specifying the object appearance. The output sequence is used by a rendering system 34 to print one or more objects from the output sequence onto a substrate to produce a customized flat substrate 50. The rendering system 34 includes a computing device and a document production device, such as a processor and printer.

Figure 2:
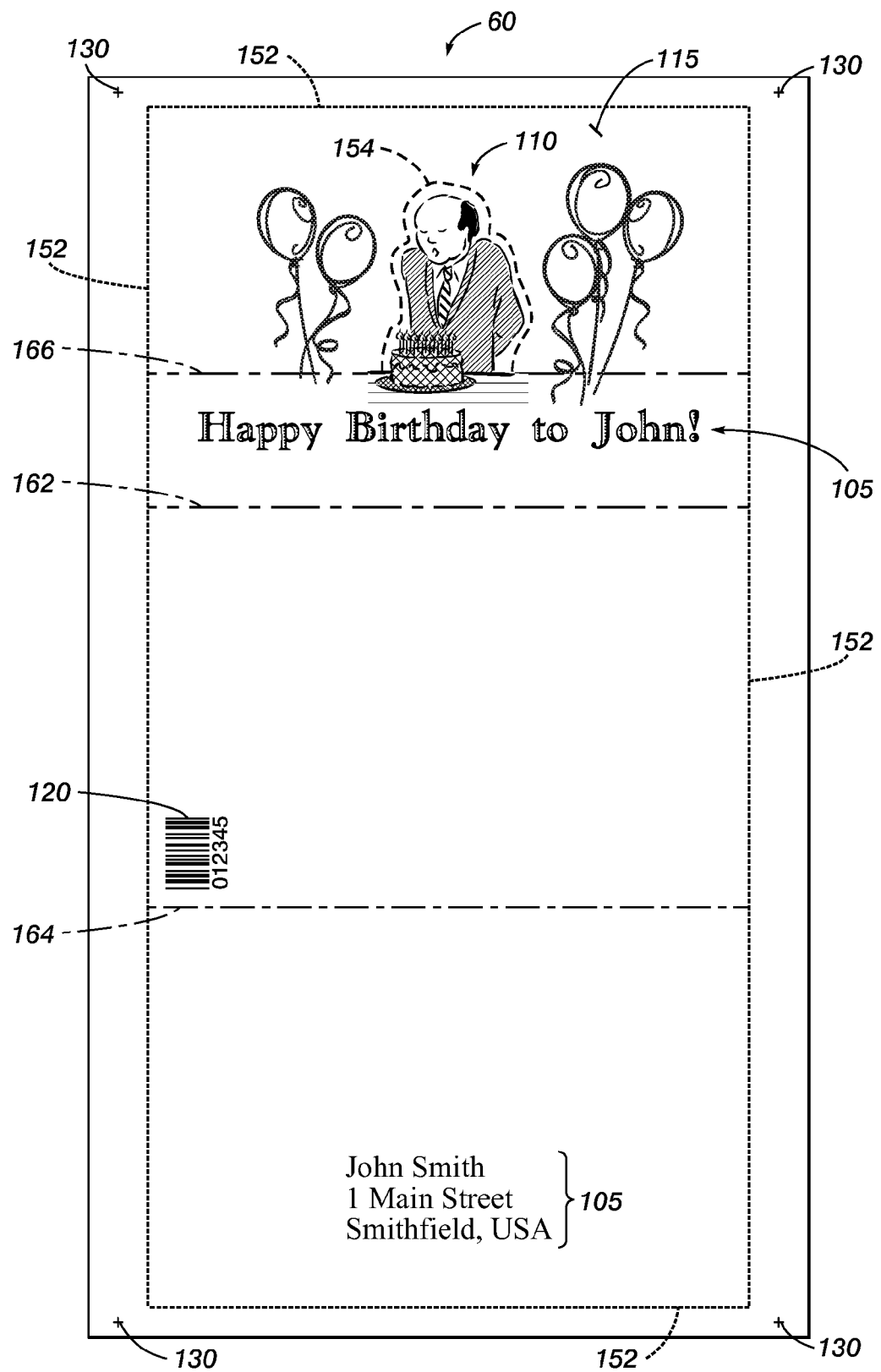
FIG. 2 depicts an exemplary printed two-dimensional flat that can be transformed to a printed substrate by a finishing system.

Referring to FIG. 2, an exemplary object printed on a substrate 60 may include any printed material, including but not limited to text 105 (such as a mailing address, a customized message, other text), custom graphics 110 (such as an image of an item to be placed inside a custom package or a corporate logo), a background 115, or other material such as a unique identifier 120 such as a bar code, hash sequence, serial number, or other material. The printed objects also may include one or more reference marks 130 that other devices can use to identify known positions on the substrate and print additional material or apply structural features on the substrate.

Referring back to FIG. 1, the printed, flat substrate 50 exits the rendering system 34 and is received by a converting system 44. A structural design producer 40 also receives the recipient record and uses the generator to generate a customized die line output code sequence 42. The customized die line output code sequence also may be in an object-oriented code such as VPS, VRML, PPML, Adobe Illustrator (AI), or PDF. The structural design producer 40 is a processor and/or a program instruction set running on a processor that be either common with and part of, or separate from, the processor and/or instruction set used as the document instance generator 30. Optionally, the structural design producer 40 may access a dies database 48 which contains layout information for pages of dynamic document instances, and the structural design producer 40 may use this information to generate the die line sequence 42.

The converting system 44 is an electromechanical device that applies cuts, creases, perforations, folds, and/or other structural features along the die lines. The converting system 44 receives the die line output code sequence 42 and uses the die line code sequence to identify positions to apply cuts, perforations, punches, folds, slits, inserts, adhesive coatings, indentations, and/or other structural features, thus yielding a customized, finished substrate 72. The converting system may perform this using any now or hereafter known methods, such as by using the reference objects to locate positions on the substrate and applying die lines based on specific data found in a recipient data file and/or the die line output code sequence, edge detection techniques to apply a cut or perforation around an image edge, die line files selected based on a unique identifier printed on the substrate, or other methods.

Referring to FIG. 2, the structural features applied to the customized substrate may include cut or perforation lines such as a document border cut line 152 and an image cut line 154, a crease or fold line 162, 164, 166, or other lines that apply structure to the substrate. For the substrate 60 in FIG. 2, after the border cut line 152 and image cut line 154 are applied, the converting system may cut the substrate along the border cut line 152 and image cut line 154. The converting system may then apply folds along the fold lines 162 and 164, as well as fold line 166, so that when the document is folded, the image 110 dimensionally separates from the background 115 to exhibit a three-dimensional structure.

The system described above can thus produce multiple, customized printed three-dimensional documents, packages or other substrates for each recipient record in the recipients database. In some embodiments, the system can concurrently launch multiple production paths to concurrently generate individual parts of a three-dimensional object.

Figure 3:
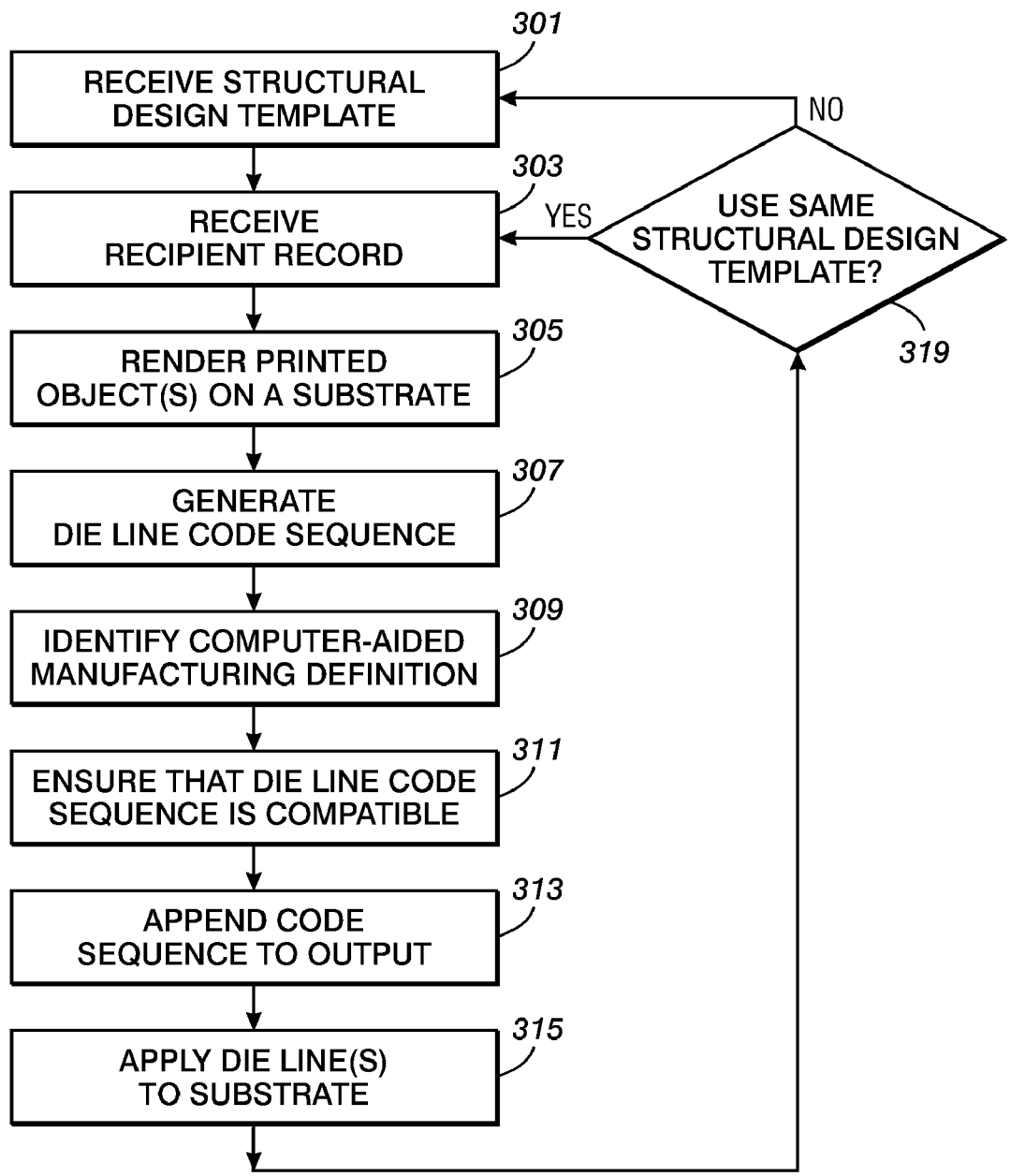
FIG. 3 is a flowchart illustrating exemplary steps of a method of producing a three-dimensional substrate.

FIG. 3 is a process flow illustrating an exemplary method of generating a customized, printed, three-dimensional substrate using a system such as that described above. Referring to FIG. 3, a method of printing a customized printed substrate includes receiving a structural design template (step 301) for a substrate to be printed; receiving a recipient record (step 303) from a recipients database or list; using the recipient record to render one or more printed objects (step 305) on the printed substrate; and generating a die line code sequence (step 307) based on the structural design template and the recipient record. The die line code sequence may include instructions for creating a first die line, such that the die line corresponds to data from the recipient record and a position on the substrate to which a structural feature will be applied. The method also may include appending the first code sequence to a first output code sequence in an object-oriented language (step 313), and using a converting system to apply (step 315) the structural features to the substrate along the die line or lines based on the code sequence. The application of structural features (step 315) may include applying a crease, fold, cut, insert, slit, adhesive, perforation or other structural feature to the first substrate along the first die line.

Optionally, the method also may include identifying (step 309) a computer-aided manufacturing definition for the converting system and ensuring (step 311) that the instructions for creating the first die line are compatible with the computer-aided manufacturing definition. Generating each die line code sequence (step 307) may include generating a customized set of instructions for the die line based on the data from the corresponding recipient record.

In some embodiments of the method, the rendering (step 305) may include printing a unique identifier, such as a bar code, on the first substrate. If so, generating the code sequence may include using the unique identifier to identify and select the first die line.

The method may be repeated for a second recipient record and corresponding second printed substrate, as well as additional records and substrates. If so, the code sequences for each substrate may be included in a single code sequence or in separate code sequences. Optionally, before repeating the document creation for a new recipient, the method may include determining whether the additional document(s) should use the same structural design template or a new structural design template (step 319).

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A production system for producing a printed substrate having customized structural features, comprising:
    a memory storing a plurality of recipient records, each recipient record including at least one object to be printed on a customized substrate and data corresponding to at least one structural feature;
    a data iterator that selects a recipient record from the memory;
    a document instance generator that generates a document rendering output sequence in an object-oriented code, the document rendering output sequence comprising instructions for printing at least one object from the selected recipient record on the customized substrate;
    a rendering system that prints the at least one object on the customized substrate;
    a structural design producer that generates a customized die line output code sequence in an object-oriented code based on the at least one structural feature from the selected recipient record; and
    a converting system that applies a structural feature to the customized substrate based on the customized die line code sequence to yield a customized, printed substrate.

2. The system of claim 1, wherein the application of a structural feature comprises applying a crease, fold, cut, insert, slit, adhesive, or perforation to the substrate along the die line.

3. The system of claim 1, wherein the object-oriented code is compatible with the variable print specification (VPS) language, personalized print markup language (PPML), virtual reality modeling language (VRML), or portable document format (PDF).

4. The method of claim 1, wherein the data iterator and the document instance generator comprise a single processor.

5. The method of claim 1:
    wherein the data iterator comprises a first processor and the document instance generator comprises a second processor, and
    the system further comprises a content buffer that enables the first processor to operate as a producer, the second processor to operate as a consumer, and the first and second processors to operate together in a producer-consumer manner.

6. The system of claim 1, further comprising:
    a definitions dictionary containing reusable object names and definitions for the names,
    wherein the document instance generator also uses information from the definitions dictionary to generate the document rendering output sequence.

7. The system of claim 6, further comprising:
    a dies database comprising layout information for pages of dynamic document instances;
    wherein the structural design producer also uses information from the dies database dictionary to generate the die line output code sequence.

8. A method of printing a customized printed substrate, comprising:
    receiving a structural design template for a first substrate to be printed;
    receiving a first recipient record;
    rendering, based on the first recipient record, at least one printed object on the first printed substrate;
    generating a first code sequence based on the first structural design template and the first recipient record, wherein the first code sequence comprises instructions for creating a first die line for the first substrate, the first die line corresponding to data from the first recipient record;
    appending the first code sequence to a first output code sequence in an object-oriented language; and
    using, by a converting system, the first output code sequence to apply at least one three-dimensional structural feature to the first substrate in accordance with the first die line.

9. The method of claim 8, further comprising:
    receiving a second recipient record;
    rendering, based on the second recipient record, at least one printed object on a second substrate;

generating a second code sequence, wherein the second code sequence comprises instructions for creating a second die line for the second substrate, the second die line corresponding to data from the second recipient record;

appending the second code sequence to a second output code sequence in an object-oriented language; and using, by the converting system, the second output code sequence to apply at least one three-dimensional structural feature to the second substrate in accordance with the second die line.

10. The method of claim 9, wherein the first output code sequence and the second output code sequence are included in a single code sequence.

11. The method of claim 9, wherein the first output code sequence and the second output code sequence are included in separate code sequences.

12. The method of claim 8, wherein the object oriented language comprises hypertext markup language (HTML) virtual reality modeling language (VRML), variable print specification (VPS), or personalized print markup language (PPML).

13. The method of claim 8, further comprising:
identifying a computer-aided manufacturing definition for the converting system;
wherein the instructions for creating the first die line comprise instructions that are compatible with the computer-aided manufacturing definition.

14. The method of claim 8, wherein generating a first code sequence comprises selecting and retrieving, from a computer-readable memory, a set of instructions for the first die line.

15. The method of claim 8, wherein generating a first code sequence comprises generating a customized set of instructions for the first die line based on the data from the first recipient record.

16. The method of claim 8, wherein
rendering the at least one printed object on the first printed substrate comprises rendering a unique identifier on the first substrate; and
generating the second code sequence comprises selecting, based on the unique identifier, the first die line based on the unique identifier.

17. The system of claim 8, wherein the applying at least one structural feature comprises applying, by the converting system, a crease, fold, cut, insert, slit, adhesive, or perforation to the first substrate along the first die line.

18. A method of printing a customized printed substrate, comprising:
receiving a structural design template for a first substrate to be printed;
receiving a first recipient record;
rendering, based on the first recipient record, at least one printed object including a first identifier on the first printed substrate;
generating a first code sequence based on the first structural design template and the first recipient record, wherein the first code sequence comprises instructions for creating a first die line for the first substrate, the first die line corresponding to data retrieved based on the first identifier;
appending the first code sequence to a first output code sequence in an object-oriented language;
using, by a converting system, the first output code sequence to apply at least one three-dimensional structural feature to the first substrate along the first die line;
receiving a second recipient record;
rendering, based on the second recipient record, at least one printed object including a second identifier on a second substrate;
generating a second code sequence, wherein the second code sequence comprises instructions for creating a second die line for the second substrate, the second die line corresponding to data retrieved based on the second identifier;
appending the second code sequence to a second output code sequence in an object-oriented language; and
using, by the converting system, the second output code sequence to apply at least one three-dimensional structural feature to the second substrate along the second die line.

19. The system of claim 18, wherein applying each three-dimensional structural feature comprises applying, by the converting system, a crease, fold, cut, insert, slit, adhesive or perforation.

* * * * *